United States Patent
Seksaria et al.

(10) Patent No.: US 7,386,382 B2
(45) Date of Patent: Jun. 10, 2008

(54) STEERING COMPENSATED SPEED OVERRIDE FOR VEHICLE DRIVE SYSTEM

(75) Inventors: Arun Kumar Seksaria, Cedar Falls, IA (US); Mervin Peter Kizlyk, Cedar Falls, IA (US); Robert Eugene Kasten, Denver, CO (US)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 11/328,013

(22) Filed: Jan. 9, 2006

(65) Prior Publication Data

US 2007/0162211 A1  Jul. 12, 2007

(51) Int. Cl.
   *G06F 19/00* (2006.01)
   *B60T 7/12* (2006.01)
   *B60W 10/04* (2006.01)

(52) U.S. Cl. ............... 701/51; 701/50; 701/53; 701/54; 701/87; 180/170; 180/248; 56/10.2 R; 477/107

(58) Field of Classification Search ........... 701/36, 701/48, 50, 51, 53, 54, 56, 58, 65, 69, 70, 701/71, 72, 74, 75, 79, 82, 84, 99, 101, 102; 56/10.3; 180/197; 303/164, 165; 280/93.505
See application file for complete search history.

(56) References Cited

U.S. PATENT DOCUMENTS

| | | | |
|---|---|---|---|
| 4,439,832 A * | 3/1984 | Sato et al. | 701/79 |
| 5,015,040 A * | 5/1991 | Lin | 303/113.2 |
| RE33,663 E * | 8/1991 | Kade et al. | 701/78 |
| 5,498,072 A * | 3/1996 | Shimizu | 303/191 |
| 6,002,979 A * | 12/1999 | Ishizu | 701/86 |
| 6,226,587 B1 * | 5/2001 | Tachihata et al. | 701/72 |
| 6,449,552 B2 * | 9/2002 | Ohba et al. | 701/89 |
| 6,456,925 B1 | 9/2002 | Romig | |
| 6,508,102 B1 * | 1/2003 | Margolis et al. | 73/8 |
| 6,839,618 B2 * | 1/2005 | Matsuno et al. | 701/67 |
| 7,130,729 B2 * | 10/2006 | Shin et al. | 701/42 |

(Continued)

FOREIGN PATENT DOCUMENTS

EP    0875414    4/1998

*Primary Examiner*—Jack Keith
*Assistant Examiner*—Jonathan M Dager

(57) ABSTRACT

A method of controlling a vehicle drive system is provided for a vehicle having an internal combustion engine, free-wheeling steerable front wheels, driven rear wheels, an infinitely variable transmission (IVT) transmitting torque from the engine to the rear wheels, and a control unit for controlling the IVT as a function of sensed parameters and supplying a speed command to the IVT for commanding a speed of the rear wheels. The method includes sensing a steering angle of the front wheels, sensing a front wheel speed, sensing a rear wheel speed, generating a corrected estimated vehicle speed as a function of the front wheel speed and the sensed steering angle, and increasing the speed command in response to a comparison between the corrected estimated vehicle speed and the rear wheel speed. The infinitely variable transmission is preferably embodied by a hybrid electric drive system. The estimated vehicle speed value is determined as a function of a gear ratio of a rear wheel drive, the front wheel speed, a rolling radius of the front wheel, a rolling radius of the rear wheel, and the steering angle of the steerable front wheels. The speed command is increased when the rear wheel speed is less than 90% of the corrected estimated vehicle speed.

3 Claims, 2 Drawing Sheets

U.S. PATENT DOCUMENTS

| | | |
|---|---|---|
| 7,162,333 B2* | 1/2007 | Koibuchi et al. ............... 701/1 |
| 2002/0002433 A1* | 1/2002 | Matsuno ...................... 701/67 |
| 2003/0216212 A1 | 11/2003 | Rodeghiero |
| 2004/0030473 A1* | 2/2004 | Lu et al. ...................... 701/36 |
| 2004/0059493 A1 | 3/2004 | Nagura et al. |
| 2004/0147366 A1 | 7/2004 | Aoki et al. |
| 2005/0027425 A1* | 2/2005 | Wang .......................... 701/70 |
| 2006/0260859 A1* | 11/2006 | Kasten et al. ............... 180/247 |

\* cited by examiner

US 7,386,382 B2

STEERING COMPENSATED SPEED OVERRIDE FOR VEHICLE DRIVE SYSTEM

BACKGROUND

This invention relates to a drive system for a vehicle.

Certain current production tractors include infinitely variable transmissions which provide an infinitely variable ratio between the engine speed and the driven wheel speed. When such a tractor is pulling a heavy trailer and is on a down slope or is decelerating, the load from the trailer must be countered by traction forces from the tires. Traction forces result in wheel slip, and large values of wheel slip reduce the ability of the tires to provide directional control or steering forces. As wheel slip increases, the tire loses its ability to provide steering force and thus the tractor loses directional stability. Thus, such an overrunning load can cause loss of directional stability.

To prevent this loss of directional stability on some current production tractors with IVT's, the rear wheel slip is limited by increasing the rear wheel speed when excessive slip is detected.

To accomplish this, the rotational speed of the front axle is sensed and this sensed speed is used as to compute a vehicle speed estimate. The front wheels are free wheeling when pulling a trailer at highway speeds, and therefore, front tire slip is negligible, and the front axle speed is a good indication of vehicle speed. Similarly, a second vehicle speed is estimated from the rear axle speed. This second speed estimated is affected by wheel slip resulting from the generation of traction forces. The rear wheel slip is calculated by computing the ratio of the speed estimates based on the rear and front wheel speeds. Because of the geometry of the tractor axles in a conventionally steered, rear wheel driven tractor, the front wheel speed increases when turning, therefore, the ratio of the rear axle to front axle drive speed is decreased when turning, and if the front axle speed is used to estimate true vehicle speed in calculating tire slip with an overrunning load, the calculated slip would be excessive and the wheel slip control algorithm would overcorrect.

Vehicle electric drive systems or AC electric traction drives have been proposed, as described in U.S. Pat. No. 5,568,023 issued 22 Oct. 1996 and in U.S. Pat. No. 6,492,785, issued 10 Dec. 2002. Such an electric drive system typically includes an engine-driven 3-phase electric motor/generator coupled to an inverter/rectifier, which, in turn, is coupled to a DC buss. The buss feeds an inverter/rectifier which supplies power to a traction motor/generator which drives an axle or a wheel. The inverter/rectifiers invert the DC current on the buss to 3-phase AC current at a frequency to drive the wheels at the speed directed by the operator. It would be desirable to apply a steering responsive slip limiting function to such a vehicle electric drive system.

SUMMARY

Accordingly, an object of this invention is to provide a system for increasing directional stability of a vehicle with an IVT under overrunning load conditions.

A further object of the invention is to provide such a system for a vehicle with a hybrid electric drive system.

These and other objects are achieved by the present invention, a method of controlling a vehicle drive system for a vehicle having an internal combustion engine, free-wheeling steerable front wheels, driven rear wheels, an infinitely variable transmission (IVT) transmitting torque from the engine to the rear wheels, and a control unit for controlling the IVT as a function of sensed parameters and supplying a speed command to the IVT for commanding a speed of the rear wheels. The method includes sensing a steering angle of the front wheels, sensing a front wheel speed, sensing a rear wheel speed, generating a corrected estimated vehicle speed as a function of the front wheel speed and the sensed steering angle, and executing an algorithm by the control unit that increases the rear wheel (vehicle) speed command in response to a comparison between the corrected estimated vehicle speed and the rear wheel speed. The vehicle drive system preferably includes an electric drive system having an electric generator driven by the engine, a first inverter/rectifier coupled to the generator, a buss coupled to the first inverter/rectifier, a second inverter/rectifier coupled to the buss, and a traction motor coupled to an output of the second inverter/rectifier and driving the rear wheels. These components form the infinitely variable transmission. The estimated wheel slip value is computed as a function of the front wheel rotational speed, a rolling radius of the front wheel, the rear wheel rotating speed, a rolling radius of the rear wheel, and the steering angle of the steerable front wheels. The rear wheel rotating speed may be measured directly or computed from the measured rear motor speed and the known gear ratio of the gear reducer between the motor and the rear wheels. When the rear wheel speed is less than the corrected vehicle speed, it indicates that the vehicle drive system is slowing the vehicle. A rear wheel speed less than a critical fraction (0.9 or 90% is used here) of the corrected vehicle speed indicates that slip is approaching a level where under some conditions, available steering force may be too low to maintain directional stability. In this case, the algorithm increases the speed command to be a critical fraction (0.9 or 90%) of the corrected estimated vehicle speed. This method of limiting rear wheel slip is appropriate to a vehicle with a hybrid electric drive system, and, by incorporating a correction for front steer angle, employs a better estimate of the vehicle speed used to determine slip.

DETAILED DESCRIPTION

Figure 1:
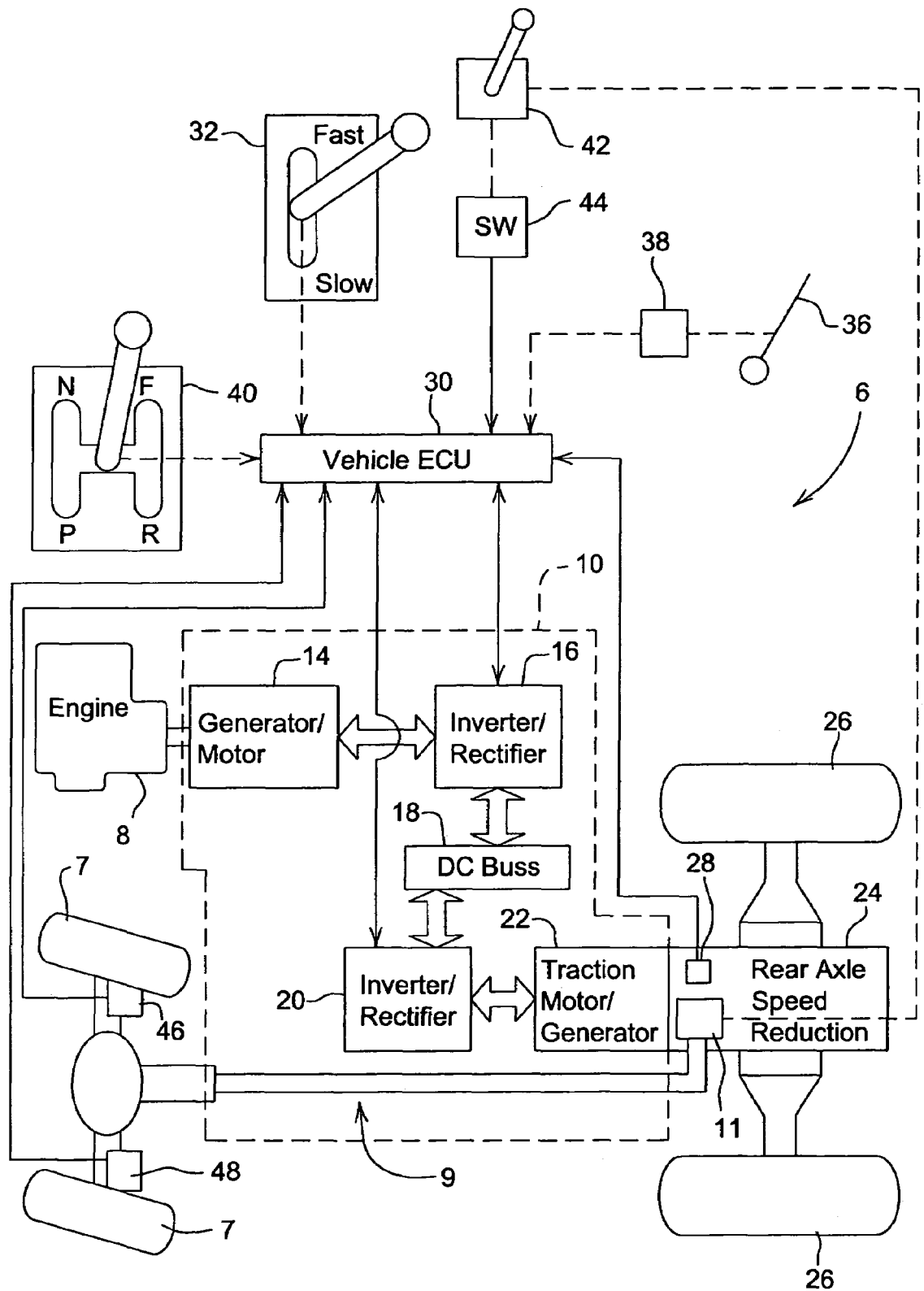
FIG. 1 is a simplified schematic diagram of a vehicle electric drive system according to the present invention.

Referring to FIG. 1, a vehicle drive system 6 includes an internal combustion engine 8, such as a compression ignition engine, which drives an infinitely variable transmission (IVT) 10, which in turn drives rear wheels 26. The IVT 10 includes an electric generator 14 which is driven by the engine 8 and which supplies electrical power to an inverter/rectifier 16. Inverter/rectifier 16 supplies electrical power to a high voltage DC buss 18. The buss 18 feeds power to inverter/rectifier 20. Inverter/rectifier 20 supplies power to traction motor 22 which drives rear wheels 26 via rear axle speed reduction unit 24 which has a fixed gear ratio GEAR. Unit 22 houses a speed sensor 28 which provides a motor speed signal to a vehicle electrical control unit ECU 30, which computes an actual rear wheel speed value RMS by multiplying the motor speed by the gear ratio GEAR. Inverter 20 generates motor currents required to drive the motor at the speed commanded by the ECU 30.

The vehicle drive system 6 also preferably includes steerable front wheels 7 driven by a mechanical front wheel drive mechanism 9, which, in turn, is driven by a mechanical front wheel drive clutch 11 connected to traction motor 22.

The generator 14 is preferably a 3-phase electric generator and may be a generator/motor, and inverter/rectifier 16 may be bi-directional. The motor 22 is preferably a 3-phase electric motor and may be a motor/generator, and inverter/rectifier 20 is bi-directional.

The IVT 10 may be an electric drive system as shown, or it may be a known hydrostatic, hydro-mechanical, or mechanical IVT.

A speed command lever 32 is coupled to vehicle ECU 30. A speed command pedal 36 is coupled to vehicle ECU 30. Lever 32 and pedal 36 may be used by an operator to set a desired vehicle speed, such as in a range of zero to 50 kilometers per hour. A forward-neutral-reverse (FNR) directional control lever unit 40 is coupled to vehicle ECU 30. A suitable lever, pedal and FNR directional control lever unit are currently known and used on production John Deere 7820 and 7720 tractors with hydro-mechanical infinitely variable transmissions. Units 32, 36 and 40 include transducers (not shown) which provide ECU 30 with signals representing the position of the respective control member.

Clutch 11 is operated by an operator controlled MFWD control lever 42. An MFWD switch 44 is operatively coupled to lever 42 and supplies a MFWD status signal to ECU 30. A front axle rotational speed sensor 46 supplies a front axle rotational speed signal, FWS, to the ECU 30. A motor rotational speed signal, MotSpd, is supplied by speed sensor 28 through inverter 20 to the ECU30. ECU 30 computes a second speed estimate as the product of the motor speed, MotSpd, the gear reduction GEAR, and a rolling radius of a rear wheel, RRrear. The action of the rear tire in producing tire force to accelerate or decelerate the vehicle results in wheel slip so that this second speed estimate is in error as a function of the tire force. For example, a tire force accelerating the vehicle results in a second speed estimate higher than the actual vehicle speed, and a tire force decelerating the vehicle (and an overrunning load) results in an second speed estimate that is lower than the actual vehicle speed. A steering angle sensor 48 supplies a steering angle signal, $\alpha$, to the ECU 30.

Figure 2:
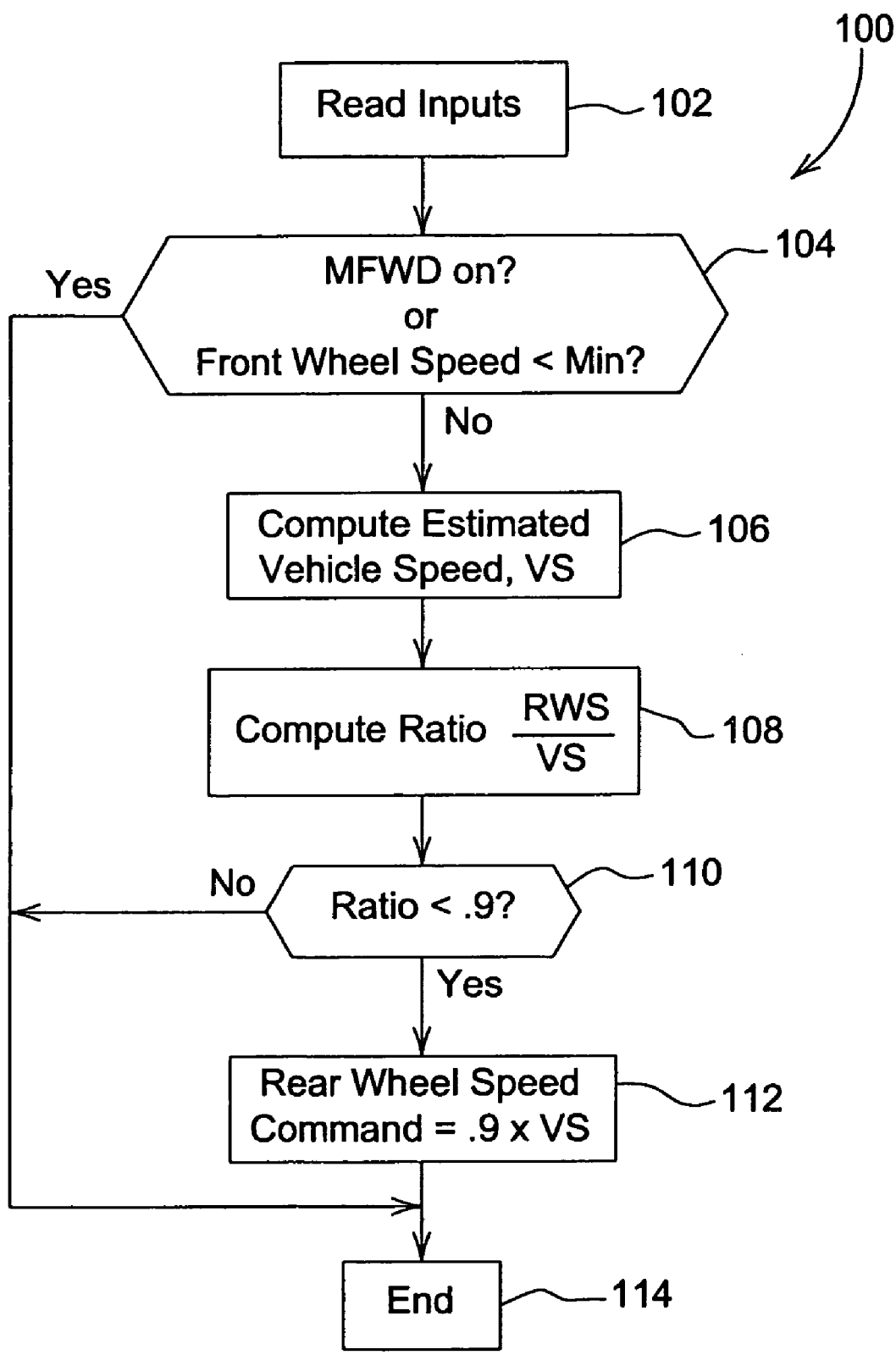
FIG. 2 is a logic flow diagram of an algorithm executed by the vehicle ECU of the control system of FIG. 1.

The ECU 30 executes an algorithm 100 represented by FIG. 2. The algorithm 100 starts at step 102 which reads various inputs, including the actual rear motor speed RMS, an actual front axle speed FWS from sensor 46, a steering angle Steer-angle from steering angle sensor 48, a mechanical front wheel drive status signal from MFWD switch 44 and a commanded speed signal Mot_Spd_Cmd from speed command lever 32 and a FNR signal from directional control unit 40.

Step 104 directs control to the end of the algorithm at step 114 if the MFWD clutch 11 is engaged or if the front wheel speed FWS is less than a minimum speed, such as 5 kph, or the FNR direction control lever is not in the foward position. Otherwise, the algorithm proceeds to step 106.

Step 106 computes two speed estimates from signal inputs from step 102. A first speed estimate, V1, is computed as the product of the front axle rotation speed from sensor 46 (in units of radians/second) and a known rolling radius of the front wheel, RRFront, as follows:

$$V1=FWS*RRfront$$

If the front axle is free wheeling and the steering angle is zero (front wheels pointed straight ahead, MFWD not engaged) this first speed estimate is an accurate estimate of the speed of the vehicle. Step 106 further computes VS, an adjustment of the first speed estimate as a function of steer angle as follows:

$$VS=(V1*\{2*WB*\cos(\alpha)+KS*\sin(\alpha)\})\div\{WB+\{[WB*\cos(\alpha)+KS*\sin(\alpha)]^2+WB^2\sin(\alpha)^2\}^{1/2}\}$$

Where WB is the wheelbase of the tractor (the distance between the front and rear axles, KS is the distance between the kingpins of the front wheels, and $\alpha$ is the steer angle of the left front wheel from straight ahead. A positive $\alpha$ is indicates a left turn and a negative $\alpha$ indicates a right turn. This equation is based on an Ackermann steering geometry for the front wheels. As a result, VS will normally match the vehicle ground speed and will be compensated for variations in the steering angle of the front wheels 7. Due to computational limitations of the ECU 30, the correction to the front wheel speed as a function of front steering angle is obtained from a table look up. A second speed estimate, V2, is computed as the product of the motor rotational speed, RMS, the gear reduction GEAR, and a known rolling radius of a rear wheel, RRrear, as follows:

$$V2=RMS*RRrear*Gear.$$

The action of the rear tire in producing tire force to accelerate or decelerate the vehicle results in wheel slip so that this second speed estimate, V2, is in error as a function of the tire force. For example, a tire force accelerating the vehicle results in a second speed estimate higher than the actual vehicle speed, and a tire force decelerating the vehicle (and an overrunning load) results in an second speed estimate that is lower than the actual vehicle speed.

Next, step 108 computes a ratio value, Ratio, as follows:

$$Ratio=(V2/VS).$$

Thus, the Ratio value will represent a ratio of actual sensed rear wheel speed to the vehicle ground speed, and will thus represent the amount of slippage of the rear wheels 26.

Step 110 then compares Ratio to a critical speed ratio (0.9 or 90% is used here). If Ratio is not less than the critical speed ratio (0.9 or 90%), step 110 directs the algorithm to step 114. If Ratio is less than the critical speed ration (0.9 or 90%), step 110 directs the algorithm to step 112.

Step 112 modifies or computes a new rear speed command as the product of the corrected vehicle speed, VS, and the critical speed ratio (0.9 or 90%) as follows: Speed_cmd=0.9×VS. The speed command is applied to the rear motor, and therefore must be modified to account for the rolling radius of the rear tire, RRrear, and the gear reduction, GEAR, between the motor speed and the rear wheel speed as follows:

$$Mot\_Spd\_Cmd=0.9*VS/GEAR*RRrear.$$

The algorithm ends at step 114, after which the ECU 30 applies the new modified rear wheel speed command to the motor 22 via the inverter/rectifier 20 so that the speed of the rear wheels 26 will match the modified rear wheel speed command computed in step 112.

As a result, this invention corrects the vehicle speed estimated from the front wheel speed by measuring the turning angle. If the speed estimate based on the rear wheel speed is less than a critical speed ratio (0.9 or 90%) of the estimated vehicle ground speed (taking into account the steering angle of the front wheels), the algorithm increases the motor speed command so that the critical speed ratio is maintained. This reduces slippage of the rear wheels 26 and improves control of the vehicle during overrunning load conditions.

The conversion of the above flow chart into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. For example, the invention is applicable to vehicles with hydrostatic and mechanical infinitely variable transmissions. Accordingly, this invention is intended to embrace all such alternatives, modifications and variations which fall within the spirit and scope of the appended claims.

We claim:

1. A method of controlling a vehicle drive system for a vehicle having an internal combustion engine, free-wheeling steerable front wheels, driven rear wheels, an infinitely variable transmission (IVT) transmitting torque from the engine to the rear wheels, and a control unit for controlling the IVT as a function of sensed parameters and supplying a speed command to the IVT for commanding a speed of the rear wheels, the method comprising:

sensing a steering angle of the front wheels;
sensing a front wheel speed;
sensing a rear wheel speed;
generating two estimates of vehicle speed, the first estimate being a function of a gear ratio of a rear wheel drive, the rear drive motor rotational speed and a rolling radius of the rear wheel and the second estimate being a function of the front wheel speed, a rolling radius of the front wheel, and the steering angle of the steerable front wheels;

generating a corrected estimated vehicle speed as a function of the vehicle speed estimates and the sensed steering angle; and increasing the speed command in response to a comparison between the corrected estimated vehicle speed and the rear wheel speed, the estimated vehicle speed value, $$VS = (V1 * \{2*WB*\cos(\alpha) + KS*\sin(\alpha)\}) \div \{WB + \{[WB*\cos(\alpha) + KS*\sin(\alpha)]^2 + WB^2\sin(\alpha)^2\}^{1/2}\},$$

where RRfront is the rolling radius of the front wheels and WB is the wheel base of the vehicle, and KS is the distance between the kingpins of the front wheels, and α is the steer angle of the left front wheel from straight ahead.

2. The method of claim 1, wherein:
the speed command is increased when the rear wheel speed is less than a critical speed ratio of the corrected estimated vehicle speed.

3. The method of claim 1, wherein:
the speed command is increased when the rear wheel speed is less than 90% of the corrected estimated vehicle speed.

* * * * *